United States Patent [19]
Patrick et al.

[11] 3,992,684
[45] Nov. 16, 1976

[54] FLASHLAMP PUMPED LASER DEVICE EMPLOYING FLUID MATERIAL FOR PRODUCING LASER BEAM

[75] Inventors: Richard M. Patrick, Winchester; Herbert W. Friedman, Peabody; John W. McCloskey, Waltham, all of Mass.

[73] Assignee: Jersey Nuclear-Avco Isotopes, Inc., Bellevue, Wash.

[22] Filed: May 19, 1975

[21] Appl. No.: 578,825

Related U.S. Application Data

[63] Continuation of Ser. No. 436,573, Jan. 25, 1974, abandoned.

[52] U.S. Cl. ............................ 331/94.5 L; 356/246
[51] Int. Cl.² ............................................. H01S 3/20
[58] Field of Search ............ 331/94.5; 356/246, 181; 330/4.3

[56] References Cited
UNITED STATES PATENTS

| 3,678,410 | 7/1972 | Kocher et al. | 331/94.5 L |
| 3,725,810 | 4/1973 | Ashkin et al. | 331/94.5 L |
| 3,740,665 | 6/1973 | Itzkan | 331/94.5 |
| 3,805,187 | 4/1974 | Lempicki | 331/94.5 |

*Primary Examiner*—William L. Sikes
*Attorney, Agent, or Firm*—Weingarten, Maxham & Schurgin

[57] ABSTRACT

A flashlamp pumped laser device employing a fluid material such as a dye solution for producing a laser beam, comprising an elongated hollow cell having an active or lasing region including a throat intermediate a continuously converging inlet chamber and a continuously diverging outlet chamber. The active region and the inlet and outlet chambers adjacent the active region are defined by two opposed inwardly curving walls formed of transparent material such as quartz. An elongated inlet manifold uniformly introduces the lasing fluid into the inlet chamber in a direction transverse to the laser output beam along the length of the active region. An elongated outlet manifold is disposed in the outlet chamber as and for the same purposes as the inlet pipe. A diverter member is disposed in the diverging portion of the outlet chamber just downstream of the active region and shaped to lessen flow separation, eddies, vortices and the like which give rise to non-uniform densities and temperatures in the lasing liquid in or as it leaves the active region. The diverter member may be integral with or separate from the outlet manifold. Alternately, the outlet manifold may also function as the diverter. A liquid cooled flashlamp is removeably disposed behind each curved wall at the narrowest portion of the active region and means are provided to prevent the flashlamp coolant from contacting those portions of the curved walls remote from the active region. Means associated with the flashlamps are provided to direct the light from the flashlamps to the active region, said means and the curved walls defining the coolant flow channels for the flashlamps.

32 Claims, 4 Drawing Figures

FLASHLAMP PUMPED LASER DEVICE EMPLOYING FLUID MATERIAL FOR PRODUCING LASER BEAM

This is a continuation of application Ser. No. 436,573, filed Jan. 25, 1974 and now abandoned.

This invention relates to laser devices and more particularly to an improved liquid laser wherein the liquid flows through the laser in a direction transverse to the laser output beam.

Solids, gases and liquids have been used as active materials in laser. Lasing is initiated by raising the energy levels of the atoms in the active material from the levels which they normally occupy to a higher energy level or excited state. This process of excitation is generally accomplished in a liquid laser by a high intensity light source.

When the atoms of an active liquid material are in an excited state, they can be stimulated to emit a photon by interaction with an incident photon. As a result, the incoming photon, or wave, is augmented by the one given up by the excited atom. The released wave falls in phase with the wave that triggered its release. Hence, an amplifying action ensues.

The active liquid material is excited while in a laser cell. In order to sustain laser operation, the laser cell forms part of a resonant cavity having two separated reflecting surfaces, one of which is partially transmissive. The wave caused by the release of the photon from the atom in the excited material must travel a path which is substantially parallel to the longitudinal axis of the resonant cavity so that it may be repeatedly reflected through the active material. As the wave travels through the material, it stimulates more atoms to release photons which further amplifies and reinforces the wave. Each time the wave is reflected at the partially transmissive reflecting surface, a small portion of it passes through the surface. This small portion constitutes the laser output beam.

Two desirable properties of the laser output beam are coherence and collimation. Optical distortion of the laser output beam occurs when there is an impairment of either of these properties. The optical characteristic of a liquid active material which primarily determines the quality of the output laser beam is the uniformity of the refractive index of the liquid which, in turn, is dependent upon the uniformity of the liquid's temperature and density. When an optically pumped liquid laser is excited, large amounts of heat may be absorbed unevenly by the liquid tending to cause it to have warmer and cooler layers which results in a non-uniform refractive index. Excitation of the laser while these non-uniform conditions exist may cause optical distortion of the laser output beam. Further, if flow separation, eddies, vortices and the like exist in the active region or resonant cavity, these give rise to non-uniform densities and temperature causing further optical distortion of the laser output beam.

Optical distortion of the output beam may, in part, be prevented by insuring that isothermal conditions exist in the active or lasing region both prior to and during excitation. The flowing liquid laser, wherein the active liquid continuously flows through the active region was developed to provide a liquid laser capable of frequent, successive excitations. The time between successive excitations, which is to say the pulse repetition rate, is dependent upon the rate at which the liquid flows through the active region.

Minimum optical distortion of the output laser beam is established only to the extent that density and temperature gradients (which cause gradients in the refractive index) are at a minimum in the active region. Further, maximum pulse rate and/or power output are established only to the extent that in the presence of the above-noted necessary uniform flow conditions, excited liquid is replaced by unexcited liquid and the cross section of the active region can be optimized for optical pumping and mode control.

In accordance with the present invention, excitation of the flowing liquid laser takes place along the longitudinal axis of the active region at its narrowest point. Since the liquid flows in the transverse direction, each excitation produces an excited volume of the laser material extending along the entire longitudinal axis of the cell and extending only a relatively small distance on either side of that axis in the transverse direction. This excited volume of liquid has temperature gradients; therefore, it is desirable to replace this entire volume of excited liquid with unexcited isothermal active liquid prior to the next laser excitation. Since the liquid flows transverse to the excitation and only the smallest transverse portion of the liquid is excited, the entire volume of excited liquid must flow only a very small transverse distance before a new isothermal volume of liquid becomes available for excitation. In this manner, a relatively high pulse repetition rate is achieved with a relatively low linear flow rate. Further, since the light sources are disposed at the point of smallest cross section, which cross section may be varied both in the transverse and longitudinal directions depending on the characteristics of the light sources, optimization of the active region is easily obtainable for optical pumping and mode control.

A flashlamp pumped laser device in accordance with the invention employing a fluid material such as a dye solution for producing a laser beam comprises an active region having a longitudinal and transverse axis and a continuously convexly converging inlet chamber and a continuously convexly diverging outlet chamber coupled to the active region in spaced-apart relationship along the transverse axis. Together with the end walls, the active region and the inlet and outlet chambers adjacent the active region are defined by two opposed convex curved walls formed of a suitable transparent material such as quartz. An elongated inlet pipe is preferably provided for uniformly introducing the active liquid into the inlet chamber along the length or longitudinal axis of the active region. At about the outlet of the active region, an elongated diverter member having a generally cylindrical cross section is provided and is shaped and disposed to maintain a negative pressure gradient in the dye flow throughout the whole lasing region. The negative pressure gradient serves to lessen flow separation, eddies, vorticies and the like in or near the active region which give rise to non-uniform densities in and temperatures in the lasing fluid. In accordance with preferred embodiment, an elongated outlet pipe may be provided for both exhausting the lasing fluid and performing the diverter functions. A liquid cooled flashlamp is removably disposed behind each curved wall at the point of minimum cross section of the active region. Means are provided to prevent the flashlamp coolant from contacting those portions of the curved walls remote from the active region. Means associated with the flashlamps are provided to direct the pumping light from the flashlamps to the active region, said means and the curved walls defining the coolant flow channels for and in which the flashlamps are disposed.

In accordance with the present invention, uniform densities and temperatures are established by providing an elongated active region having a generally hourglass cross section, bringing the active liquid to the inlet of the active region at a predetermined uniform temperature, providing removable opposed liquid cooled light sources adjacent the narrowest portion of the active region, preventing non-uniform introduction of heat into the active liquid at or adjacent the inlet of the active region, and providing uniform flow conditions in the active region.

It is an object of the present invention to provide a new and improved transverse flow liquid laser construction.

It is another object of the present invention to provide a transverse flow liquid laser having curved channel walls and medium homogeneity in the active region thereby permitting optimization of the active region cross section for optical pumping and mode control.

Another object of the invention is to provide a transverse flow liquid laser having curved channel walls and means for preventing flow separation of the lasing medium at or adjacent the active region.

It is an object of the present invention to provide a new and improved laser construction in which optimum utilization of the initiating light source is used so as to reduce the required energy and cooling means required for successful operation of the laser.

Another object of the invention is to provide a transverse liquid flow laser having two liquid cooled oppositely disposed and easily removable initiating light sources in combination with an active region having a generally hourglass cross section defined by oppositely disposed curved side walls and optimum optical qualities of the liquid in the active region.

A further object of the invention is to provide a transverse liquid flow laser with an active region having a generally hourglass cross section defined by oppositely disposed curved transparent side walls through which light from liquid cooled initiating light sources is introduced into the active region which is not subject to leakage of coolant or the active liquid medium.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
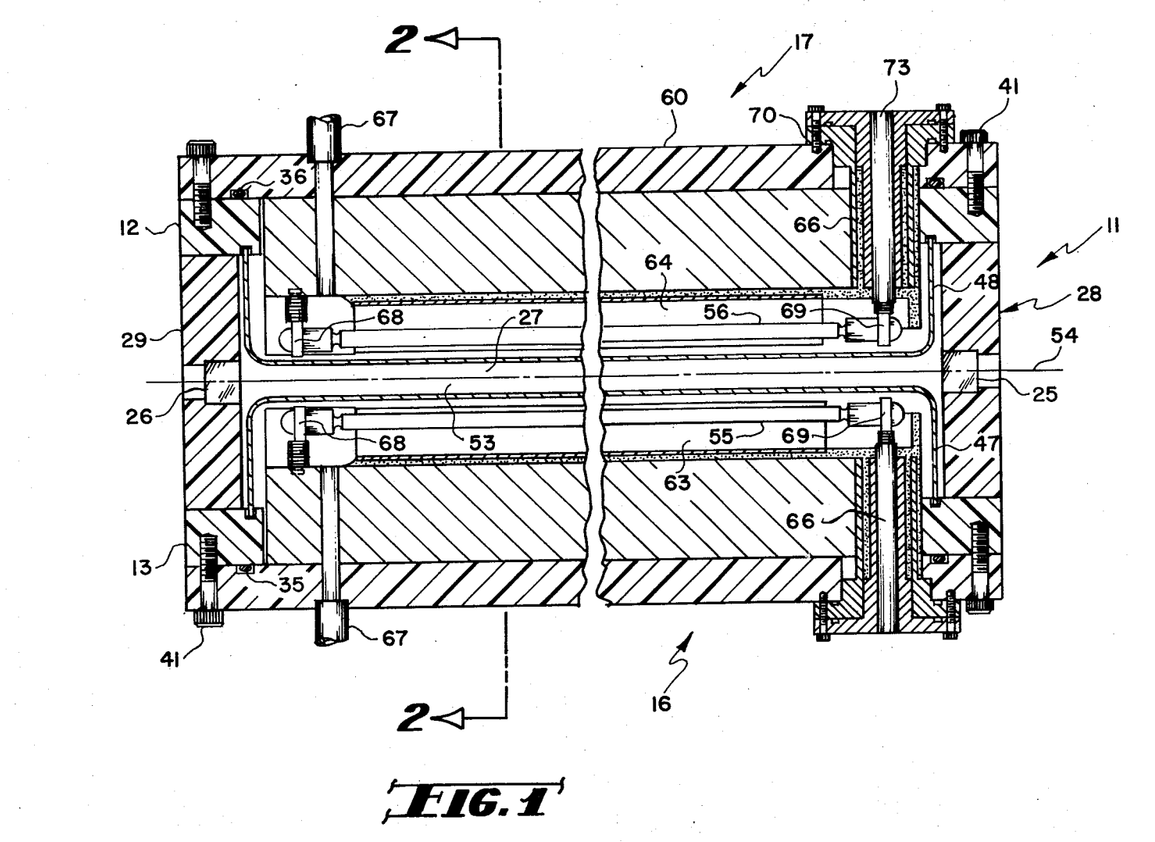
FIG. 1 is a top sectional view of a liquid laser in accordance with the invention.
Figure 2:
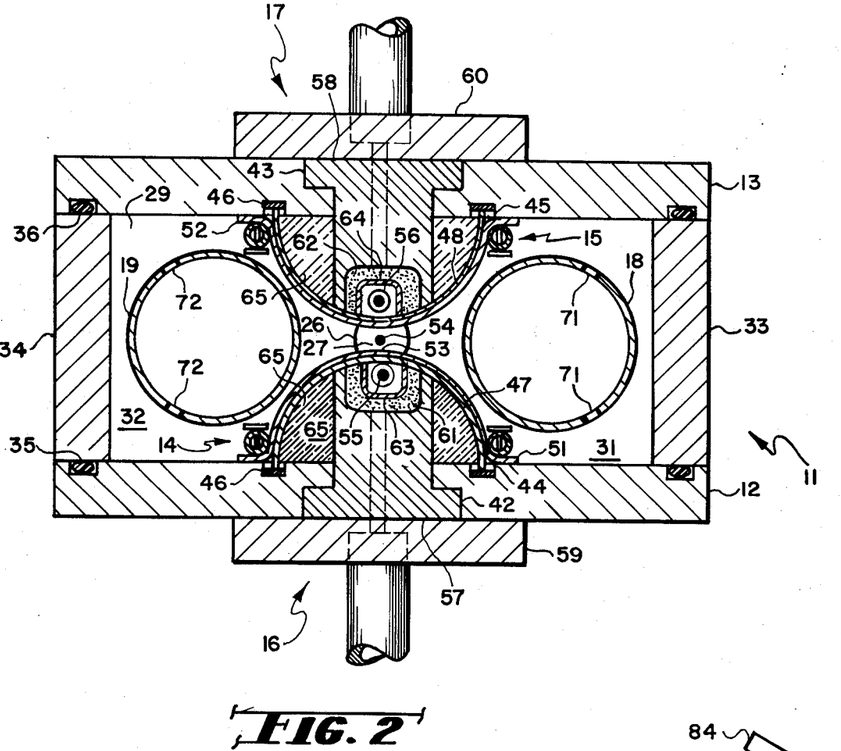
FIG. 2 is a sectional view taken on 2—z of FIG. 1.

Referring now to FIGS. 1 and 2, there is shown a liquid dye laser in accordance with the invention, comprising an integral frame 11 of rectangular configuration, opposed side walls 12 and 13, opposed optical pumping assemblies 14 and 15 carried by the side walls and including removable flashlamp portions 16 and 17, a fluid inlet manifold 18 and a fluid outlet manifold 19 disposed within the frame 11. Laser windows 25 and 26, transparent to the stimulated emission occurring in the working or lasing region 27 intermediate the flashlamp portions are sealably carried in the end walls 28 and 29 of the frame 11.

The flat inner surfaces of the frame and side walls in the absence of the oppositely disposed optical assemblies define an elongated rectangular prismatic volume. The optical assemblies are carried by and extend substantially the length of the central portions of the side walls and, by reason of their inwardly extending convex configuration, effectively separate the interior of the frame into an inlet chamber 31, an outlet chamber 32 and a working region 27, intermediate the inlet and outlet chambers.

Frame 11 is conveniently formed on a flat base member 33, flat top member 34 and flat end walls 28 and 29 to define an integral and rigid member for supporting the other components and attachment to a suitable base (not shown). The sides of the frame are provided with grooves 35 and 36 to receive O rings which sealably engage the side walls. To facilitate maintenance and repair, the side walls are conveniently removably attached to the frame as by bolts 41. The frame and side walls are formed of a suitable rigid electrically non-conductive material, such as PVC.

The provision of a frame to which is removably attached in sealing engagement side walls as shown and described herein wherein the frame is rigidly attached to a base permits substantially complete disassembly and reassembly of the laser without affecting alignment of the components comprising the optical cavity.

Openings 42 and 43 are provided in the central portion of and extending substantially the length of each side wall to removably receive the flashlamp portions of the optical pumping assemblies. Surrounding openings 42 and 43 on the inner surfaces of the side walls are grooves 44 and 45 each containing a silicon gasket 46 to receive the periphery of transparent semi-cylinders wall members 47 and 48 conveniently formed from one-half of a quartz tube closed by both ends. Semi-cylindrical transparent wall members 47 and 48 may be held in sealing engagement with the side walls via the silicon gaskets by clamping end bands 51 and 52. Quartz is preferred for the wall members 47 and 48 because of its ability to resist discoloring. The transparent wall members 47 and 48 curve inwardly toward each other to define a throat or nozzle 53 with the optical axis 54 preferably being located at their closest point of spacing. While a cylindrical configuration has been shown for wall members 47 and 48, it is to be understood that this is not critical. Thus, the side portions remote from the optical axis may have a curvature or slope different from that shown so long as it is compatible with providing as uniform a flow as is reasonably possible toward and away from the working or lasing region 27.

Disposed on opposite sides of the optical axis are flashlamps 55 and 56, each carried in support members 57 and 58 which are adapted to be sealably carried in the side wall openings 42 and 43. The support members 57 and 58 which may be formed of aluminum are each provided with a channel or recess 61 and 62 defining narrow leg portions each having an end surface adapted to be disposed at least closely adjacent the inner surfaces of the transparent wall members. Carried within the recesses 61 and 62 are elongated U-shaped reflectors 63 and 64 in which are disposed the flashlamps 55 and 56. The reflectors are conveniently formed of quartz, their outer surfaces being made reflective to protect the reflective coating from coolant which flows around and along the flashlamps, as more fully discussed hereinafter. The reflectors may be bonded to the support members as by a suitable adhesive, such as RTV, to permit attaching them in place and to restrict coolant to the region surrounding the flashlamps.

As may be best seen from inspection of FIG. 1, the flashlamp portions 16 and 17 extend substantially the length of the frame. The metal support members 57 and 58 are disposed within the side walls and for safety purposes are covered with electrically non-conductive cover plates 59 and 60. An inlet coolant passage 66 is provided at one end of each support member and an outlet coolant passage 67 at the opposite end. The flashlamps are held in position by metal clips 68 and 69. Clips 68 are electrically connected to the support members and function through the support members as the ground connection of the flashlamp high voltage circuit. Disposed in coolant inlet passage 66 and electrically insulated from the supporting members as by high voltage insulator sleeves 70, is a metal pipe 73 to the end of which is connected clip 69. Coolant is introduced through pipe 73 which also functions as the high voltage connection for the flashlamps.

The portions of the volume enclosed by the transparent wall members and not occupied by the flashlamps portions, are filled with an insulating material 65 effective to prevent the transfer of heat from the flashlamp coolant into the liquid active medium in the inlet and outlet chambers. Provision of insulating material as described above is effective to restrict the flow of coolant substantially only to the region immediately surrounding the flashlamps. Thus, the flow of flashlamp coolant is limited to that region immediately surrounding the flashlamps, thereby preventing the existence of thermal discontinuities or inhomogeneity in the active liquid medium as it enters and flows through the lasing region that would otherwise result from permitting hot stagnant coolant to fill these regions. This feature of beam quality protection is achieved while permitting the use of simple and inexpensive assembly features.

The active liquid medium is introduced to the inlet chamber 31 via a manifold 18 having a plurality of exhaust ports or slots 70 disposed along the length of the working region 27. The inlet manifold 18 functions to uniformly introduce the active liquid medium into the inlet chamber 31 and provide a uniform flow along the length of the active region 27, even though the active liquid material enters the manifold at only one end.

Figure 4:
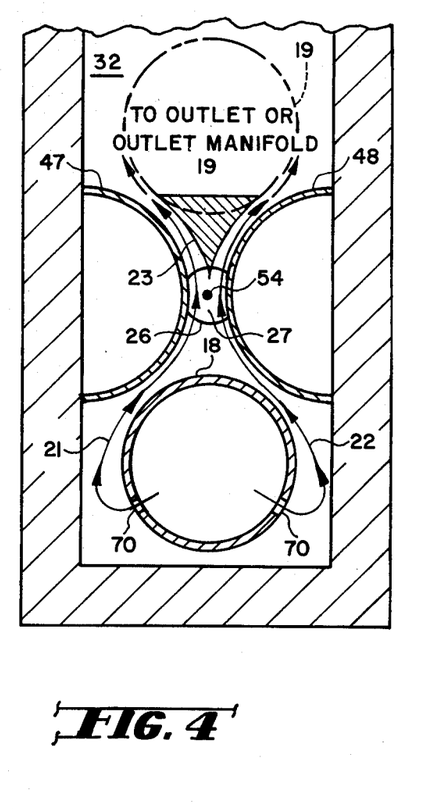
FIG. 4 is fragmentary diagrammatic sketch in side elevation showing a modification and flow within the device.

Disposed in the outlet chamber is a second manifold 19 having a plurality of inlet ports or slots 71 arranged and adapted to receive the active liquid medium on its side or portions disposed at least substantially away from the working region. Thus, as best illustrated in FIG. 4, the active liquid medium flows out of the inlet manifold 18 generally along flow lines 21 and 22 toward and through the active region 27, past diverter member 23 and into the outlet chamber 32. From the outlet chamber 32, the active liquid medium then flows either directly or through an outlet manifold to a suitable pump, reservoir and/or heat exchanger (not shown), and then back to the inlet manifold 18.

The provision of liquid cooled flashlamps in combination with convex transparent wall members as shown and described herein is particularly advantageous in the prevention, if not complete elimination, of leakage. The provision, arrangement and disposition of the frame and wall members in accordance with the invention not only practically eliminates the possibility of coolant leakage into the active liquid medium, but also leakage in the reverse direction as well as out of the laser itself. The prevention of leakage of active mediums such as fluorescent organic solutions such as rhodamine 6G has been an extremely troublesome problem in the past and in some cases, the inability to dependably prevent it has caused the abandonment of work on some dye lasers. Lasers constructed in accordance with the present invention are not subject to such defects.

The direction of flow of the active medium is not critical nor is the provision of inlet and outlet manifolds as shown and described. If desired, for example, the inlet and outlet manifolds as such may be omitted and the active medium introduced through a wall member (for example, wall member 33) and exhausted through the other wall member. However, in this case, it will be necessary to provide one or more elongated diverter members having the proper shape and spaced with respect to the optical axis and the outlet chamber portions of the transparent wall members as shown, for example, in FIGS. 2 and 4 to prevent flow separation in the working region caused by an increasing pressure gradient beginning at about the optical axis and extending in the downstream direction.

Thus, the liquid flow from the inlet to the outlet is given by $$P + \frac{\rho v^2}{2} = \text{constant} = \text{total pressure}$$

As may now be seen, as flow accelerates upon entering the working region, the pressure will decrease. However, absent a suitably shaped diverter (or an outlet manifold in the downstream region which not only perform the same function as the shaped diverter, but also provide a simple and effective means of exhausting the active liquid medium), the pressure would rise as the velocity of the flow decreases upon leaving the working region thereby causing or tending to cause in the working region flow separation, eddies, vortices and the like which give rise to non-uniform densities and temperature. Density and temperature gradients in the working region cause gradients in the refractive index of the lasing medium which distorts the laser output beam.

In accordance with one feature of the invention, the diverter and/or exhaust manifold is shaped and disposed sufficiently near the optical axis at the throat to provide a favorable pressure gradient throughout the flow in the active region. Because the fluid flow is subsonic, this member influences the flow pressure upstream from its leading end and provides a favorable pressure gradient even though it does not extend into the throat. Broadly, this is achieved if the total cross sectional area between the outlet manifold or diverter and the transparent wall members is comparable to the cross sectional area of the throat.

Stated differently, this is also achieved if the distance between the diverter and the transparent side walls is comparable to the width of the throat. If desired, the small stagnation region that may occur at the upstream portion of the diverter may be eliminated by draining off the liquid medium through small holes at this point. Where provided, the area of the drain holes should be small compared to the main exhaust ports so that the desired pressure profile is not adversely effected.

A diverter member 23 per se or in combination with an outlet manifold as and for the purposes hereinbefore described may be provided in the diverging portion of the outlet chamber just downstream of the active region as shown by way of example in FIG. 4. The cross sectional shape of diverter member 23 will depend on the shape of wall members 47 and 48. For cylindrically shaped wall members as shown by way of example, the diverter member 23 is advantageously cusp-shaped in cross section. The diverter member 23 is preferably formed of an inert thermally insulating material, e.g., a suitable plastic such as, for example, PVC to prevent thermal gradients from forming in the liquid laser material and should not project significantly into the active region where it could give rise to parasitic lasing modes. Provision of diverter member 23 permits flexibility in the use, size and/or configuration of manifold 19 (including its omission) and serves to more effectively maintain, if not maintain per se, a negative pressure gradient in the liquid active medium flow throughout the whole lasing region.

An especially useful property of lasers, which use fluorescent organic solutions such as rhodamine 6G as the amplifying medium is the large bandwidth over which amplification occurs. This makes it possible to vary the output wavelength of such lasers by a number of means. Of these, the well-known use of a diffraction grating or a prism provides the greatest convenience because tuning can be achieved by a simple mechanical adjustment. The primary advantage of prism tuning is that prisms can be designed so that the light enters and leaves near Brewster's angle, giving reflection losses that are much smaller than grating losses. This feature is beneficial for flashlamp pumped systems because it extends the wavelength range over which sufficient gain can be obtained for lasing and increases the power output. Another advantage of prism tuning over commercial replica gratings in the much higher threshold of glass for damage by laser radiation.

Figure 3:
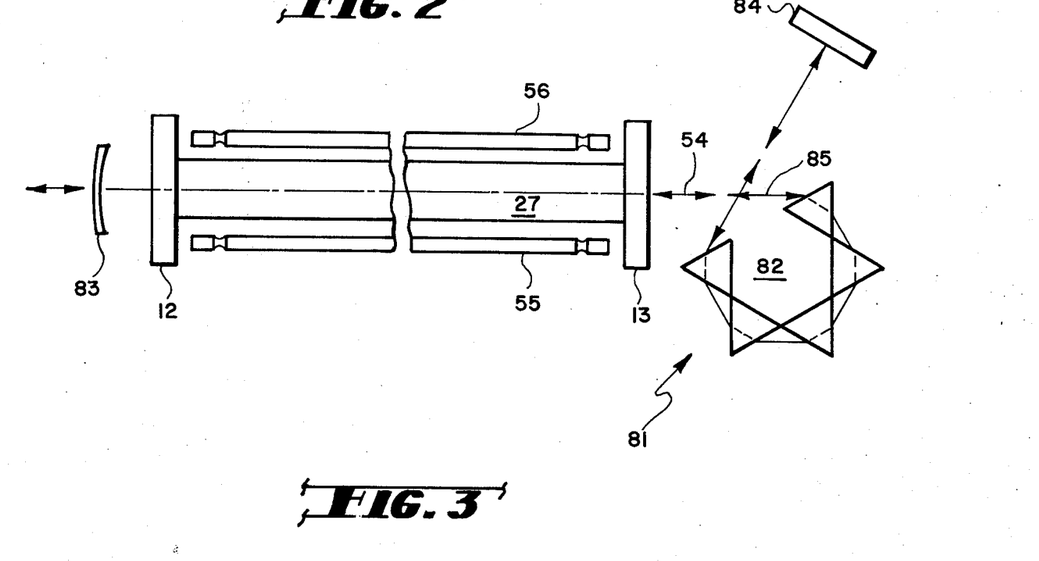
FIG. 3 is a partially pictorial and partially block diagrammatic illustration of a tunable optical cavity including a working region in accordance with the invention.

FIG. 3 shows the working region 27 and flashlamps 55 and 56 in combination with tuning means 81 comprising a five-prism chain 82 for providing varying output wavelengths. Disposed adjacent and exterior of the side wall 12 is a fixed partially transmissive conventional output mirror 83. Output mirror 83 may be about 85% transmissive and is aligned on the optical axis 54. Disposed adjacent and exterior of the opposed side wall 13 is a five-prism chain 82 for receiving output radiation from the working region along the optical axis and directing it to an adjacent fully reflective tuning mirror 84.

Output mirror 83 and tuning mirror 84 in conventional manner define an optical cavity. The prism chain 82 is disposed in the light path 85 and the tuning mirror 84 adjusted about its axis to allow for prism deviation. Further, the inner surfaces of the output mirror 83 is preferably of a configuration to facilitate alignment of the optics and its outer surface is of a configuration to correct for dispersion caused by the inner surface.

As with any tuning system, considerable care in alignment of the mirrors is required. The laser beam must remain normal to the stationary or output mirror 83 so that the beam angle at the prism face adjacent to the laser remains fixed when the tuning mirror is rotated. The angles between the laser beam and the other faces change, however, during tuning, by an amount that increases as the tuning mirror is approached so that the beam of the desired wavelength always strikes the tuning mirror normally and is reflected back through the prism array.

Adjustment of the tuning mirror 84 determines the wavelength reflected back into the working region and, hence, the wavelength that is amplified and transmitted through the output mirror as the laser output beam.

As may now be apparent, the tuning mechanism may comprise a series of prisms arranged so that the light from the lasing medium of a given wavelength will pass through each prism and be reflected by a plain tuning mirror back upon itself, through the lasing medium and to the output mirror. The angles of the prisms and the glass from which they are formed are selected so that light enters and leaves each prism at an angle which results in minimum reflection losses, i.e., at the Brewster's angle for the combination. A suitable angle of the prism has been found to be 60°. This angle is desirable because the cost of making it is relatively low.

A ray of light of the frequency to which the optical system is tuned and which is parallel to the optical axis is amplified in the lasing medium, passes through an output window to the first prism where some of it is reflected and lost. The remaining portion is refracted or bent as it passes through the prism. The bending is such that the ray falls on the next prism where it is again refracted or bent so as to fall on the next prism. This continues until the ray strikes the mirror and is reflected back on itself. A ray of longer or shorter wavelength starting along the same path through the prism system will be bent less or more respectively and, thus, will impinge on the mirror at some angle to the normal and thereby be reflected off axis and lost. As previously noted, the desired wavelength is selected by rotating the tuning mirror.

For a more thorough discussion of prism tuning, reference is made to "Flash Tube-Pumped Dye Laser with Multiple-Prism Tuning" by F. C. Strome, Jr. and J. P. Webb, Vol. 10, No. 6, *Applied Optics*, June 1971, which is incorporated herein by reference as if fully set out.

In operation, a liquid active medium such as, for example, rhodamine 6G dissolved in methonal is pumped through the working region at which point it is irradiated by the flashlamps. The active medium radiates stimulated emission at a characteristic wavelength which is a function of the active medium and the geometry of the optical cavity. The direction of flow through the active region is perpendicular to that of the direction of the radiation from the flashlamps and both are perpendicular to the optical axis.

Rhodamine 6G lases in a bandwidth of roughly from about 5800A° to 6000A° (yellow-orange). Different bands of wavelengths over which the laser can be tuned may be provided by the provision of different active mediums and/or solvents.

By using various well-known combinations of, for example, dyes and solvents, the laser can be tuned over the range from about 4500A° to 6500A° which is to say approximately over the entire visible spectrum.

The flashlamps may be standard quartz Xenon-filled flashlamps pulsed at a rate of from 1 to about 50 pulses per second. The flashlamps are cooled and maintained at a suitable operating temperature by flowing a suitable volume of coolant such as tap water along their length. The active medium is most conveniently caused to be circulated from a reservoir to and through the laser and back into the reservoir. The reservoir may include means for cooling the active medium so that it is always introduced into the laser at a predetermined constant temperature. Alternately, cooling means separate from the reservoir may be provided.

Where inlet and outlet manifolds are used in accordance with the preferred embodiment, they are provided with a series of flow ports or slots. The inlet slots should be of a size and location that most or all of the pressure drop occurs as the active medium flows through them to establish a uniform flow along the entire length of the inlet manifold.

Preferably, the inlet manifold is disposed below the outlet manifold, the active medium flowing out of the bottom of the inlet manifold up through the working region and out of the laser through the outlet manifold. A separate diverter may be provided or, as previously pointed out in the preferred embodiment, an outlet manifold may be provided which serves as a diverter to prevent the existence in the working region of flow separation, eddies, votices and the like which give rise to distortion of the output laser beam.

Conventional Xenon-filled flashlamps operate as a spectral lamp at some given current density. At some much higher current density, Xenon flashlamps radiate as a blackbody with a continuous spectrum extending all across the visible spectrum and well into the ultraviolet.

Because some dyes which lase in the blue spectral region must be pumped with ultraviolet radiation, the flashlamps must be operated at sufficiently high current densities such as, for example, in excess of about 10,000 amperes per square centimeter.

Of all the energy produced by the flashlamps, only about 10% is converted into laser light and only about 10 to 20% of the electric energy supplied to the flashlamps is converted into light. The length of a flash may be between about 0.1 and 1 microsecond depending on the repetition rate used. The shorter pulses are provided at the higher repetition rates. The laser pulse is of substantially the same length as the flashlamp pulse, The lifetime of the inverted population is short, generally about 5 nanoseconds, hence, as soon as the flashlamps shut off, the lasing stops. If the flashlamp pulse is sufficiently increased, a point is reached at which it heats the active medium non-uniformly and degrades the laser beam quality.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In a liquid laser device for producing a laser beam along its optical axis employing a liquid laser material flowing in a direction transverse to and through said optical axis, the combination comprising:

a. means defining a hollow elongated body member having an active region intermediate and coupled to an inlet chamber having an inlet port for receiving said liquid laser material and an outlet chamber having an outlet port for exhausting said liquid laser material, said active region having a transverse axis and a longitudinal axis, said longitudinal axis defining said optical axis, said liquid laser material flowing from said inlet chamber through said active region and into said outlet chamber along the length of said longitudinal axis and parallel to said transverse axis;

b. a pair of oppositely disposed curved transparent wall members carried within and extending substantially the length of said body member intermediate said inlet and outlet chambers, said wall members each curving inwardly and having an innermost central window portion intermediate first and second side portions, said central window portions defining opposed sides of said active region, said first side portions defining a portion of said inlet chamber adjacent the upstream end of said active region and said second side portions defining a portion of said outlet chamber adjacent the downstream end of said active region;

c. first means for introducing liquid laser material into said inlet chamber;

d. second means for receiving liquid laser material from said outlet chamber;

e. diverter means disposed in said outlet chamber arranged and adapted to at least substantially prevent increase in pressure in said liquid laser material as it flows out of said active region;

f. high intensity light means for energizing liquid laser material in said active region;

g. removable means for directing a flow of coolant over said light means, said means including a pair of elongated generally U-shaped reflective members, said light means being disposed in said U-shaped members whereby substantially all of the light from said light means is directed into said active region;

h. insulating means at least substantially preventing the transfer of heat into said liquid laser material through said inlet chamber first side portions; and i. means for coupling said laser beam out of said body member along said optical axis.

2. The laser device of claim 1 wherein said diverter means obstructs the flow of liquid flowing out of said active region along said transverse axis, said diverter means defining a flow path along each said second side portion.

3. The laser device of claim 2 wherein said diverter means comprises a diverter member extending the length of said active region.

4. The laser device of claim 3 wherein said diverter member includes an annular hollow member generally cylindrical in cross section, said hollow member having a longitudinal axis parallel to said optical axis and being spaced a distance from said optical axis of the order of the diameter of said hollow member.

5. The laser device of claim 4 wherein said hollow member has a plurality of ports coupling the interior of said outlet chamber with the interior of said hollow members, and the interior of said hollow member is coupled to said outlet chamber outlet port.

6. The laser device of claim 5 wherein the ports in said hollow member are remote from said second side portions whereby liquid laser material must flow at least substantially past said second side portions.

7. The laser device of claim 2 wherein said body member comprises:
   a. a hollow rigid center frame member; and
   b. oppositely disposed side members sealably connected to said frame member, said transparent wall members being sealably connected to the inner surfaces of said side members centrally of said frame member, and said removable means is sealably carried by and projects through said side members and into said wall members.

8. A liquid laser device for producing an output laser beam along its optical axis and employing a liquid laser material comprising:
   a. means defining an elongated active region including first and second oppositely disposed curved transparent side walls, said side walls each convexly curving inwardly, said active region having a transverse axis and a longitudinal axis, said longitudinal axis defining said optical axis, said active region having an inlet and an outlet portion extending the length of and on opposite sides of said optical axis;
   b. inlet chamber means defining an inlet chamber coupled to said active region inlet portion for directing liquid laser material into said active region, said inlet chamber means including third and fourth elongated oppositely disposed converging side walls at said active region inlet portion;
   c. outlet chamber means defining an outlet chamber coupled to said active region outlet portion for receiving said liquid laser material from said active region, said outlet chamber means including fifth and sixth elongated oppositely disposed diverging side walls at said active region outlet portion;
   d. first means for receiving liquid laser material under pressure from a source of liquid laser material and introducing said liquid laser material into said inlet chamber;
   e. second means for exhausting liquid laser material from said outlet chamber;
   f. diverter means disposed in said outlet chamber arranged and adapted to at least substantially prevent increase in pressure in said liquid laser material as it flows out of said active region;
   g. high intensity light means for energizing liquid laser material in said active region;
   h. removable means for directing a flow of coolant over said light means, said means including an elongated U-shaped reflective member the extreme ends of which abut the exterior of said first and second side walls, said light means being disposed in said U-shaped members whereby substantially all of the light from said light means is directed into said active region;
   i. insulating means at least substantially preventing the transfer of heat into said liquid laser material through said inlet chamber side walls; and
   j. means for coupling said laser beam out of said active region along said optical axis.

9. The laser device of claim 8 wherein said diverter means comprises an obstruction to the flow of liquid in said outlet chamber means along said transverse axis and forces liquid flowing out of said active region to flow substantially uniformly along said fifth and sixth side walls.

10. The laser device of claim 9 wherein said diverter means comprises an annular hollow first member extending the length of said active region and having a longitudinal axis parallel with and spaced from said optical axis, said first member being disposed substantially intermediate and spaced from said outlet chamber means fifth and sixth side walls, said first member having a plurality of ports coupling the interior of said outlet chamber means with the interior of said first member, and the interior of said first member is coupled to said second means.

11. The laser device of claim 10 wherein said first means comprises an annular hollow second member extending the length of said active region and having a longitudinal axis parallel with and spaced from said optical axis, said second member being disposed substantially intermediate and spaced from said inlet chamber means third and fourth side walls, said second member having a plurality of ports coupling the interior of said inlet chamber means with the interior of said second member, and the interior of said second member is coupled to said first means.

12. A cell for a laser utilizing flowing liquid laser material flowing in a direction transverse to and through an optical axis, comprising:
   a. an inlet chamber for receiving said liquid laser material;
   b. an outlet chamber for exhausting said liquid laser material;
   c. an active region coupled to and intermediate said inlet and outlet chambers, said active region being defined by a pair of oppositely disposed curved wall members disposed within said cell and extending substantially the length of said optical axis, said wall members each curving inwardly and having an innermost central transparent window portion defining opposed sides of said active region; and
   d. diverter means disposed in said outlet chamber adjacent said active region arranged and adapted to at least substantially prevent increase in pressure in said liquid laser material flowing out of said active region.

13. The cell of claim 12 wherein said diverter means comprises an obstruction to the flow of liquid along said optical axis entering said outlet chamber and forcing said liquid flowing out of said active region to flow substantially uniformly along said curved wall members and tend to prevent non-uniform flow conditions in said liquid laser material leaving said active region.

14. The laser cell of claim 12 wherein said diverter means includes a diverter member having opposed side surfaces generally converging toward said optical axis and spaced from said curved wall members to define fluid flow paths therealong, said side sufaces having a curvature substantially the same as that of said curved wall members opposite therefrom.

15. The laser cell of claim 14 wherein said diverter means includes an elongated hollow liquid outlet manifold disposed in said outlet chamber for receiving liquid laser material from said diverter member and exhausting said liquid from said outlet chamber.

16. The laser cell of claim 12 wherein said diverter means comprises an elongated generally cylindrical hollow liquid outlet manifold having a longitudinal axis parallel to said optical axis, said manifold being spaced a distance from said optical axis of the order of the diameter of said manifold.

17. A cell for a laser utilizing a flowing liquid laser material flowing in a direction transverse to and through an optical axis, said cell comprising:
   an inlet chamber for receiving said liquid laser material;
   an outlet chamber for exhausting said liquid laser material;
   a pair of oppositely disposed wall members defining a passage for said liquid laser material between said inlet and outlet chambers;
   an active region for lasing within said passage, said active region being defined between portions of said pair of oppositely disposed wall members;
   said wall members extending substantially parallel to said optical axis and converging toward each other in the direction from said inlet chamber to said active region; and
   means disposed in said passage generally toward said outlet chamber from said active region for substantialy preventing increase in pressure in said liquid laser material flowing out of said active region toward said outlet chamber.

18. The cell of claim 17 wherein said means for preventing pressure increase comprises an obstruction to the flow of said liquid laser material transverse to said optical axis toward said outlet chamber which forces said liquid laser material in flowing out of said active region to flow substantially along said wall members thereby to prevent flow separation in said active region.

19. The cell of claim 17 wherein said means for preventing pressure increase includes an obstruction to the flow of said liquid laser material from said active region to prevent flow separation of said liquid laser material in said active region.

20. The cell of claim 17 wherein said means for preventing pressure increase includes means for generally maintaining the cross sectional area down stream of said active region similar to the cross sectional area of said active region.

21. The cell of claim 17 wherein said means for preventing pressure increase is formed of an inert thermally insulating material.

22. The cell of claim 17 further including:
   a source of excitation radiation extending generally parallel to said optical axis and located behind each of said wall members to direct excitation therefrom toward said active region;
   said wall members adjacent said active region having a material transparent to said excitation radiation.

23. A laser producing a laser output beam along an optical axis of said laser from a liquid laser medium flowing in a direction transverse and through said optical axis, said laser comprising:
   an inlet chamber for receiving said liquid laser material;
   an outlet chamber for exhausting said liquid laser material;
   a pair of oppositely disposed wall members defining a passage for said liquid laser material between said inlet and outlet chambers;
   an active lasing region within said passage, said active region being defined between portions of said pair of oppositely disposed wall members;
   said wall members extending substantially parallel to said optical axis and converging towards each other in the direction from said inlet chamber to said active region;
   the portions of said pair of oppositely disposed wall members defining said active region including transparent windows;
   source means for providing optical pumping of said liquid laser material and placed to illuminate said active region through said windows;
   means for flowing said liquid laser material through said active lasing region from said inlet chamber to said outlet chamber; and
   means disposed in said passage for said liquid laser material generally toward said outlet chamber from said active region for substantially preventing increase in pressure in said liquid laser material flowing out of said active region toward said outlet chamber.

24. The laser of claim 23 wherein said source means of laser optical pumping includes flashlamps.

25. The laser of claim 24 further including reflectors for directing flashlamps emissions toward said active region.

26. The laser of claim 24 wherein said windows comprise quartz.

27. The laser of claim 24 wherein said flashlamps extend substantially parallel to said optical axis.

28. The laser of claim 24 further including means for substantially preventing the transfer of heat from said flashlamp into said liquid laser material.

29. The laser of claim 23 wherein said means for preventing pressure increase comprises an obstruction to the flow of said liquid laser material transverse to said optical axis toward said outlet chamber which forces said liquid laser material in flowing out of said active region to flow substantially along said wall members thereby to prevent flow separation in said active region.

30. The laser of claim 23 wherein said means for preventing pressure increase includes an obstruction to the flow of said liquid laser material from said active region to prevent flow separation of said liquid laser material in said active region.

31. The laser of claim 23 wherein said means for preventing pressure increase includes means for generally maintaining the cross-sectional area downstream of said active region similar to the cross-sectional area of said active region.

32. The laser of claim 23 wherein said means for preventing pressure increase is formed of an inert thermally insulating material.

* * * * *